Figure 1:
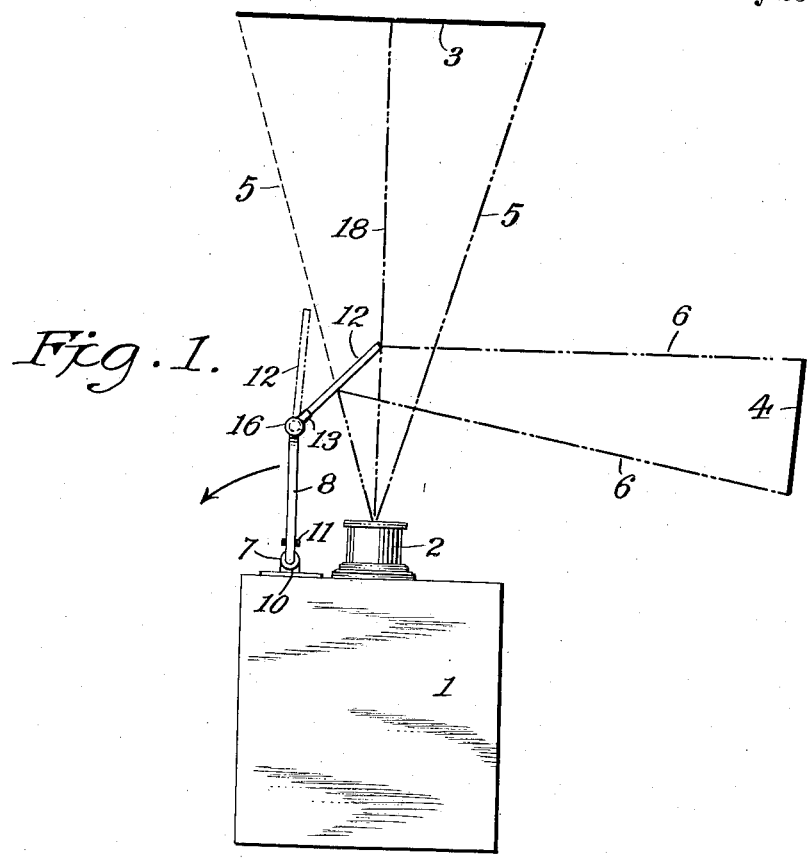

J. W. RAMSAY.
CAMERA.
APPLICATION FILED MAY 26, 1917.

1,273,183.

Patented July 23, 1918.

James W Ramsay, Inventor.
By his Attorneys
Phillips Abbott

UNITED STATES PATENT OFFICE.

JAMES W. RAMSAY, OF NEW YORK, N. Y.

CAMERA.

1,273,183.

Specification of Letters Patent. Patented July 23, 1918.

Application filed May 26, 1917. Serial No. 171,099.

*To all whom it may concern:*

Be it known that I, JAMES W. RAMSAY, a subject of the Kingdom of Great Britain, and a resident in the borough and county of Bronx, city and State of New York, have invented a new and useful Improvement in Cameras, of which the following is a specification, reference being had to the accompanying drawings.

My invention is peculiarly adapted to so-called view cameras and may be beneficially employed in so-called taking cameras for cinematograph or motion picture exposures.

Generally stated, the invention consists in providing adjacent to the lens of the camera, and either above, below, or at either side thereof, a movable mirror pivotally supported at one side of the axis of the camera lens and so constructed and arranged that it will normally remain outside of the lines which define the focal area of the lens, but which, when desired, may be swung more or less into that area, or entirely across it, as desired, so as to substitute for the normal field of the lens a wholly or partially different field lying laterally thereof, thus introducing within the normal field of the lens so much as desired of such other or laterally located field. The mirror is mounted in such manner that it will not distort vertical lines, so that the resulting negative or negatives will properly portray the subject matter in both of the fields.

In the drawings I illustrate a simple form of my invention, the camera being shown diagrammatically merely. It will of course be understood that it is furnished with the equipment usual in such apparatus.

Figure 2:
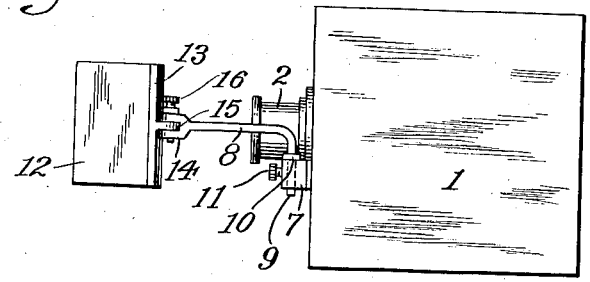

Referring to the drawings, Figure 1 is a plan view of a camera embodying my invention; Fig. 2 is an elevation thereof.

In the drawings 1 represents the camera box, 2 the usual lens casing in which a suitable lens of such focal length, as preferred, with the usual devices for its manipulation, are present. The line 3 indicates the normal field of the lens and the line 4 that which I will designate as one of the lateral or supplemental fields. The lines 5, 5, indicate the diverging boundaries of the focal area of the lens extending to the normal field 3, and 6, 6, the like lines extending to the supposed supplemental field 4. 7 is a socket fastened in any suitable manner to the front, or other appropriate part of the camera box. 8 is an arm, preferably bent as shown, and having at one end a pintle 9, with a collar 10 above it, adapted to enter into the socket 7 and turn therein. 11 is a thumb screw by which the arm 8 can be rigidly held in any adjusted position. 12 is preferably a frameless mirror supported at its back edge only upon a suitable backing 13, and provided with an extending perforated stud 15 adapted to enter between the sides of a bifurcated bearing 14 made on the free or swinging end of the arm 8. This bearing is provided with a thumb nut 16, by which the mirror can be rigidly held in any adjusted position.

The operation is as follows:

During the normal use of the camera the mirror and the arm 8, which carries it, will either be disconnected from the camera or swung backwardly, as, for instance, in the direction of the arrow, as shown in Fig. 1, the mirror itself being swung away from the diverging lines 5, 5, of the focal area of the lens, as shown in dotted lines in Fig. 1. When, however, it is desired to take into the picture any subject located within a lateral or supplemental field, such as the field 4, then the mirror is swung across the appropriate line 5 to such degree as may be necessary to take into the picture the desired subject matter in the supplemental field. For example, in Fig. 1, the mirror 12 is shown as swung across the diverging left hand line 5, defining the focal area of the lens, to the medial line thereof indicated by the numeral 18. An exposure made when the parts are in this condition will result in a negative which will show the subject matter embraced within the right hand half of the normal field 3, and the subject matter embraced within the supplemental field 4, which, being depicted within the mirror, will be taken up by the lens and included within the picture produced upon the sensitive surface in a manner well understood. Similarly, the construction of the parts being suitable, the mirror may be swung so far across the lines 5, 5, as to entirely mask or obliterate the normal field 3 and introduce as the sole subject for the negative the substituted subject matter found in the supplemental field 4. As stated above, the mirror should be without any frame on its front edge, particularly, because if there was such frame, it would be apt to be shown on the negative, thus defacing it.

I wish it to be distinctly understood that the embodiment of my invention illustrated and described herein is one form only in which the parts may be constructed. The thumb screws 11 and 16, or equivalent devices, are desirable but not essential, in order that wind drafts, or other agencies, may not move the mirror at the time of the exposure. Also I prefer to make the arm detachable in some such manner as shown, so that by simply loosening the set screw 11 and lifting the pintle 9 out from the socket 7, the mirror attachment may be entirely disconnected from the camera when not needed, thus eliminating danger of its fracture and making the apparatus more compact and convenient for transportation.

For the sake of simplification I have illustrated in the drawings an embodiment of my invention in which the mirror and its supporting socket are shown at one side only of the lens casing. It will of course be understood that the mirror may be arranged either above or below or to the right or to the left of the lens casing, so that the lateral or supplemental field brought into the exposure by the appropriate manipulation of the mirror may similarly be either above or below or to the right or to the left of the normal field; and in order that a single mirror and its attachments may suffice for these various positions, I sometimes supply additional sockets or supporting devices for the mirror and its arm 8, locating them above and below and at both sides of the lens casing, so that the mirror may be quickly and interchangeably located in such position relative to the lens as preferred. I wish it also to be understood that when herein and in the claims hereof I refer to a mirror, I do not limit myself to a glass plate silvered on the back, on the contrary, I sometimes prefer, in order to avoid double reflection, that the glass plate be silvered on its front surface, the silvering of course to be suitably burnished, as is well understood. Indeed, a highly polished metallic or other plate may be employed as the reflecting surface or mirror.

It will be obvious to those who are familiar with such matters that departures may be made from the specific disclosure herein made and yet the essentials thereof be employed. I therefore do not limit myself in this respect.

I claim:

1. A photographic camera provided with a mirror pivotally supported at one side of the axis of the lens and adapted to be moved into and out of the normal field of the lens.

2. A photographic camera provided with means for the detachable support of a mirror which is pivotally supported at one side of the axis of the lens and adapted to be moved into and out of the normal field of the lens.

3. A photographic camera provided with means for the support of a mirror at one side of the axis of the lens and adapted to be moved into and out of the normal field of the lens, and means to lock the mirror in any desired position.

4. A photographic camera provided with a frameless mirror pivotally supported at one side of the axis of the lens and adapted to be moved into and out of the normal field of the lens.

In testimony whereof I have signed my name to this specification.

JAMES W. RAMSAY.